United States Patent [19]

Jardins

[11] Patent Number: 5,023,720
[45] Date of Patent: Jun. 11, 1991

[54] SINGLE CHANNEL VIDEO PUSH EFFECT

[75] Inventor: Philip D. Jardins, Nevada City, Calif.

[73] Assignee: The Grass Valley Group, Inc., Nevada City, Calif.

[21] Appl. No.: 428,578

[22] Filed: Oct. 30, 1989

[51] Int. Cl.⁵ .................... H04N 5/262; H04N 5/272
[52] U.S. Cl. .................................. 358/183; 358/182
[58] Field of Search ................ 358/183, 22, 181, 182

[56] References Cited

U.S. PATENT DOCUMENTS

| | | | |
|---|---|---|---|
| 4,223,351 | 9/1980 | Tsujimura et al. | 358/182 |
| 4,725,888 | 2/1988 | Hakamada | 358/183 |
| 4,729,027 | 3/1988 | Hakamada et al. | 358/183 |
| 4,746,983 | 5/1988 | Hakamada | 358/903 |
| 4,774,582 | 9/1988 | Hakamada et al. | 358/183 |
| 4,833,538 | 5/1989 | Heida | 358/182 |
| 4,862,272 | 8/1989 | Karlock | 358/181 |
| 4,887,159 | 12/1989 | Chaplin | 358/181 |
| 4,903,129 | 2/1990 | Bell et al. | 358/183 |
| 4,914,516 | 4/1990 | Duffield | 358/183 |
| 4,918,531 | 4/1990 | Johnson | 358/183 |

Primary Examiner—James J. Groody
Assistant Examiner—Jeffrey S. Murrell
Attorney, Agent, or Firm—Francis I. Gray; John Smith-Hill

[57] ABSTRACT

A single channel video push effect generates push snapshots by combining a portion of a new video source with a complementary portion of an old video source to produce a combined image. Then the new and old video source portions of the combined image are swapped to produce a push snapshot. A sequence of such snapshots with increasing portions of the new video source forms the push effect.

11 Claims, 6 Drawing Sheets

SINGLE CHANNEL VIDEO PUSH EFFECT

BACKGROUND OF THE INVENTION

The present invention relates to video effects, and more particularly to a single channel video push effect to provide a high quality push effect while using only a single video effects module.

One way to make a transition from one video source to another is by doing a "push" in which the new video slides onto a viewing screen and appears to "push" the old video off the viewing screen at the same time, as is shown in FIG. 1 where the dotted lines represent the original source images and the heavy lines represent the viewed image. The transition appears as if the images represented by the two video sources were connected side-by-side and a camera is panned from one image to the other.

The push effect is a transition that appears over several video frames, with each successive frame yielding an image with the new video source slid further onto the screen and the old video source shifted correspondingly off the screen. A single frame having the old and the new video sources on the screen may be considered to be a "push snapshot." The moving push transition is a series of these snapshots with each successive snapshot showing more of the new video source and less of the old. The push transition therefore requires a means for generating these snapshots and a means for sequencing through the snapshots.

Currently there are two ways to perform push transitions. The first way is to use two time base correctors (TBCs) to individually shift each video source image, one in one direction and the other in the opposite direction. The two images are then combined to complete the push snapshot. For example, as shown in FIG. 2, the images appear to be overlaid and the old image is translated in one direction by a distance X, where X ranges from zero to one, one representing a full screen distance. The new image is translated in the opposite direction by a distance (1−X). The two images are then combined using a key signal that determines which part of the combined image comes from the old video source and which from the new video source. In other words the control key specifies that the first X portion of the screen, vacated by the old image, is filled with the new image, and the next 1−X portion of the screen, vacated by the new image, is filled with the old image. The result is that the new image appears to have pushed the old image a distance X across the screen. The second method of creating the push snapshot is similar to the first method, except the translations are done with two video effect modules.

These methods have some drawbacks. Specifically for the first method commercial TBCs have timing accuracy problems and sometimes poor video quality, while for the second method two expensive video effects channels are tied up to create a single video effect.

Therefore what is desired is a single channel video push effect that produces high quality video while using only a single video effects module.

SUMMARY OF THE INVENTION

Accordingly the present invention provides a single channel video push effect that creates a push snapshot by using a video combiner unit that combines the two input sources under control of a push key signal, the video combiner unit being followed by a video swap unit that effectively translates an incoming image with wraparound, giving a high quality push video while using only a single video effects module to perform the swap. The incoming sources enter the video combiner unit. The combiner is set via the push key signal so that the right X portion of the resulting combined image is the right X portion of the untranslated new image, and the left 1−X portion of the combined image is the left 1−X portion of the untranslated old image. The combined image is input to the video swap unit, such as a video effects module, that does a wraparound translation so that the right X portion of the new image appears at the left of the screen and the left 1−X portion of the old image appears at the right of the screen. A sequence of these snapshots are created by varying the value of X, starting with zero and ending at one, to create the effect that the new image is coming in from the left edge of the screen and pushing the old image off the right edge.

The objects, advantages and novel features of the present invention are apparent from the following detailed description when read in conjunction with the appended claims and attached drawing.

DESCRIPTION OF THE PREFERRED EMBODIMENT

Figure 1:
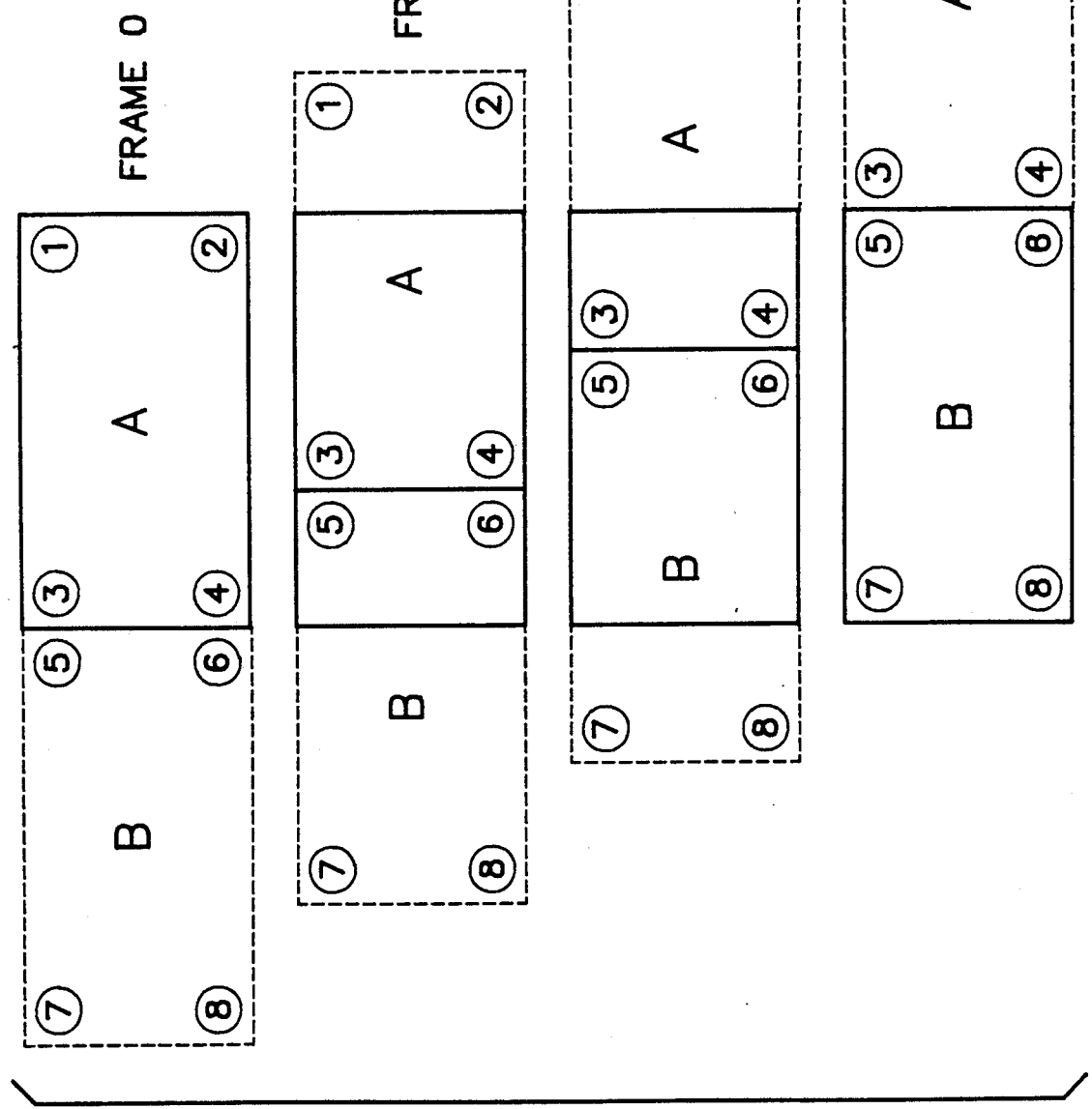
FIG. 1 is a graphic representation of a video push effect.
Figure 2:
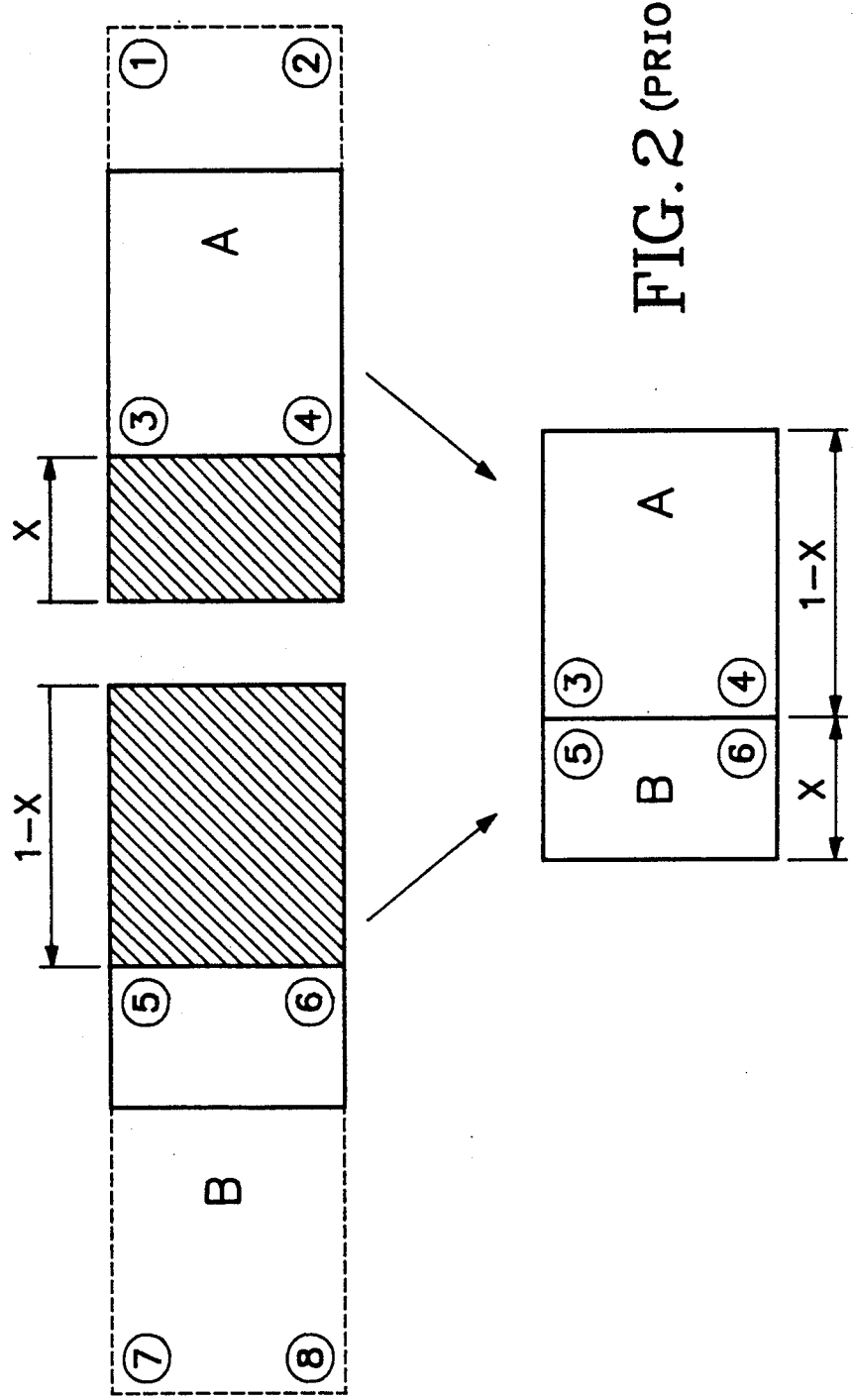
FIG. 2 is a graphic representation of a prior art method of creating a push snapshot for a video push effect.
Figure 3A:
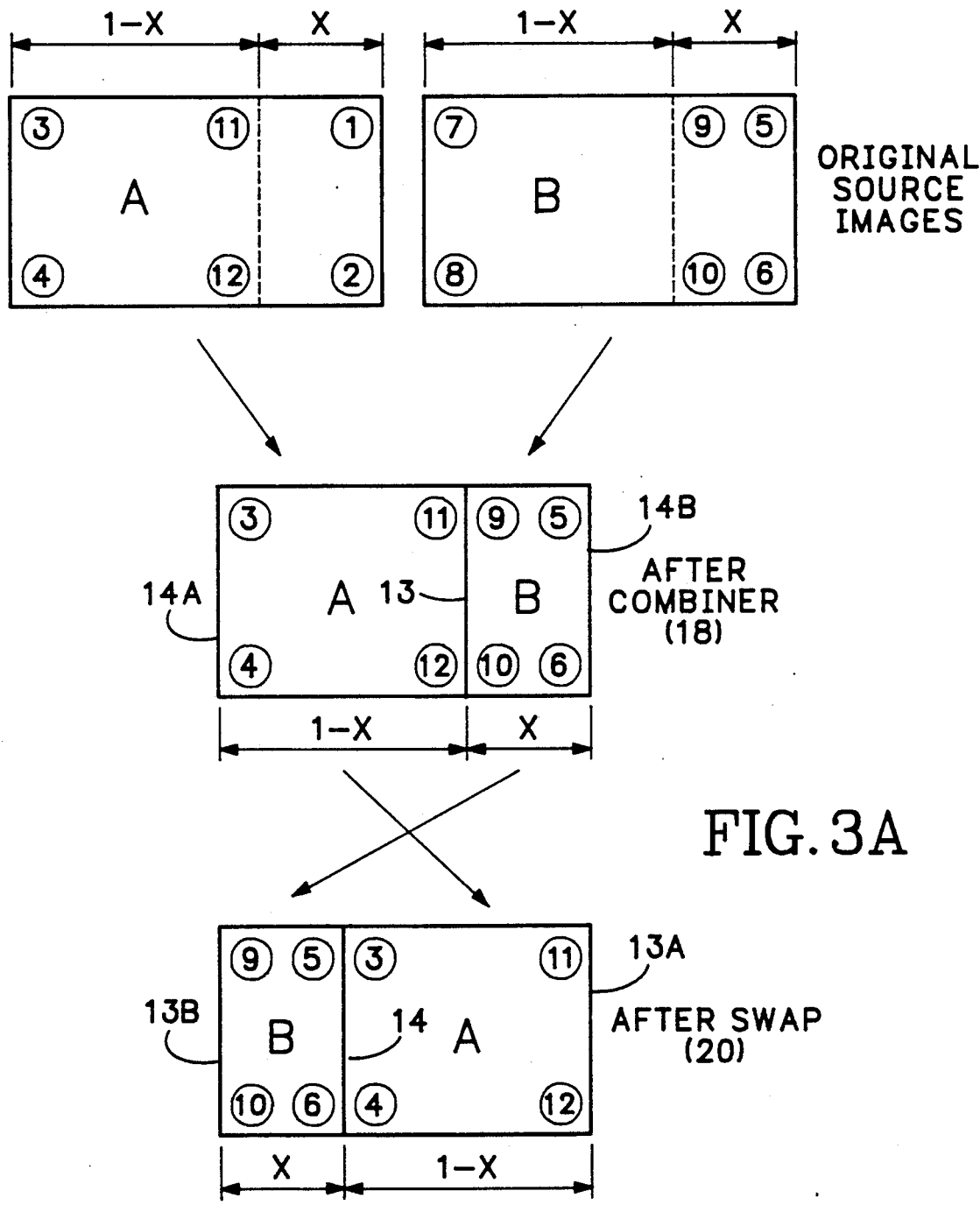
FIG. 3A is a graphic representation of a method of creating a push snapshot in the horizontal direction according to the present invention.
Figure 3B:
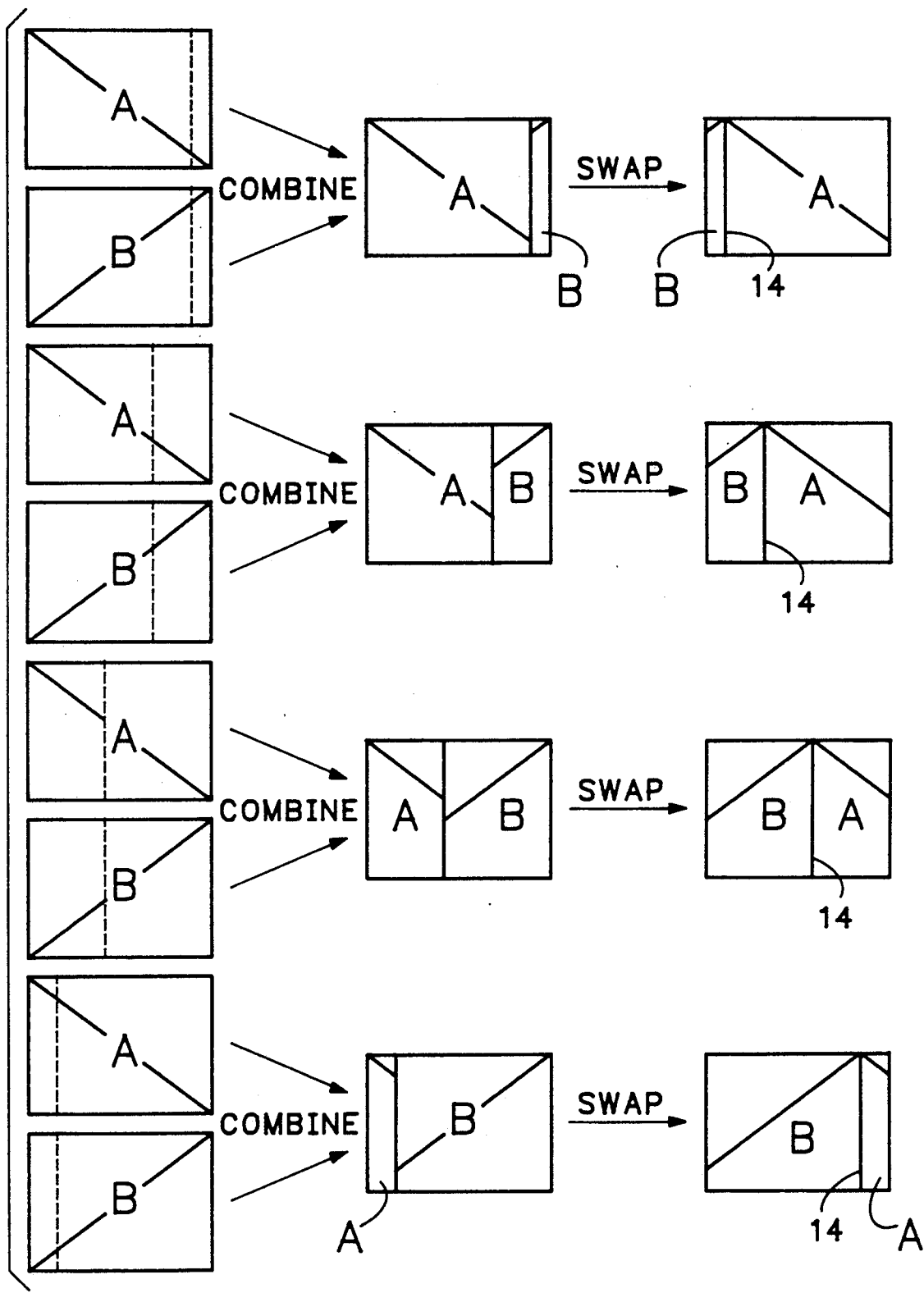
FIG. 3B is a graphic representation that illustrates creation of a succession of push snapshots and shows how the push effect is created from these snapshots.
Figure 4:
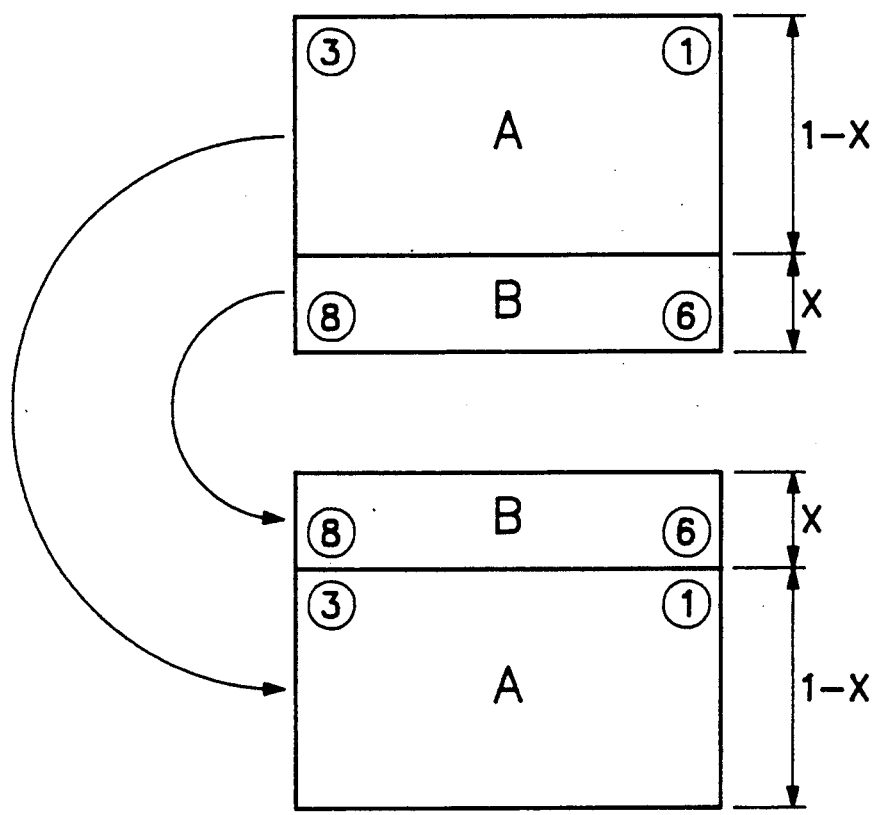
FIG. 4 is a graphic representation of a method of creating a push snapshot in the vertical direction according to the present invention.

Referring now to FIG. 3A the concept of the present invention is illustrated. Two video sources, Video A and Video B where A is the old video and B is the new video, provide respective sequences of video frames. The frames of Video A represent an image 1-4 while the frames of Video B represent an image 5-8. The images 1-4 and 5-8 each have two vertical edges and two horizontal edges. The two video sources are combined under the control of a push key signal so that for a left to right push of A by B the right X portion 5, 6, 9, 10 defined by the push key signal of B is combined with the left 1−X portion 3, 4, 11, 12 of A, which is the complement of the portion defined by the push key signal, to create an intermediate video frame 3, 4, 5, 6. The boundary 13 between the left portion of A and the right portion of B in the intermediate frame is vertical, so that it is parallel to the vertical edges 14A and 14B of portions of A and B respectively, and is located where the left edge of the X portion of Video B abuts against the right edge of the 1−X portion of Video A. The combined image Video A/B is then translated in a wraparound fashion to result in a swap so that B is the left X portion and A is the right 1−X portion of the resultant image Video B/A, i.e., the portions of A and B have been swapped in the resultant image. Swapping the Video A and Video B portions of the intermediate frame creates a push snapshot video output frame with anew boundary 14 located where edge 14A of portion A abuts against opposite edge 13B of portion B, which abutted against each other in the intermediate frame at boundary 13, are now the outer vertical edges of the push snapshot video output frame and are parallel to the new boundary 14. FIG. 3B shows the at as X changes from a small value at the top of FIG. 3B to a larger value at the bottom of FIG. 3B, a succession of snapshots is generated in which boundary 14 shifts progressively to the right, and examination of the fields at the right of FIG. 3B shows that when these snapshots are displayed in sequence a push effect in which Video B appears to push Video A off the viewing screen, as described with reference to FIG. 1, is created. In like manner as shown in FIG. 4 for a top to bottom push the lower X portion of B is combined with 35 the upper 1−X portion of A, and then A and B in the combined image are swapped by a vertical translation so that the upper X portion is B and the lower 1−X portion is A.

Figure 5:
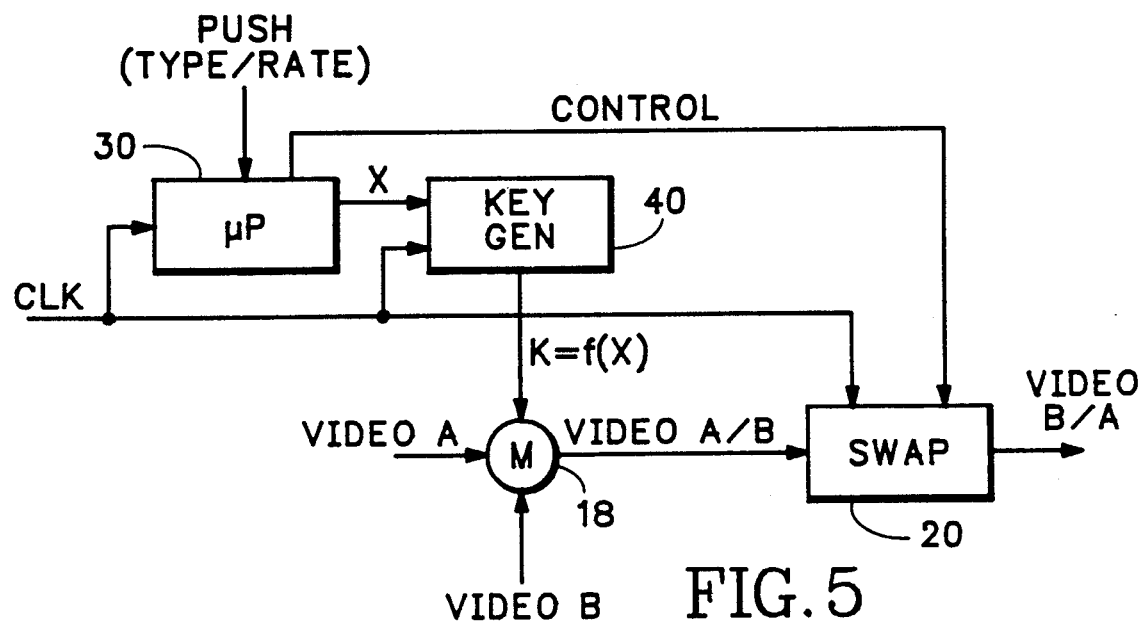
FIG. 5 is a generalized block diagram of an apparatus for performing a video push effect according to the present invention.
Figure 6:
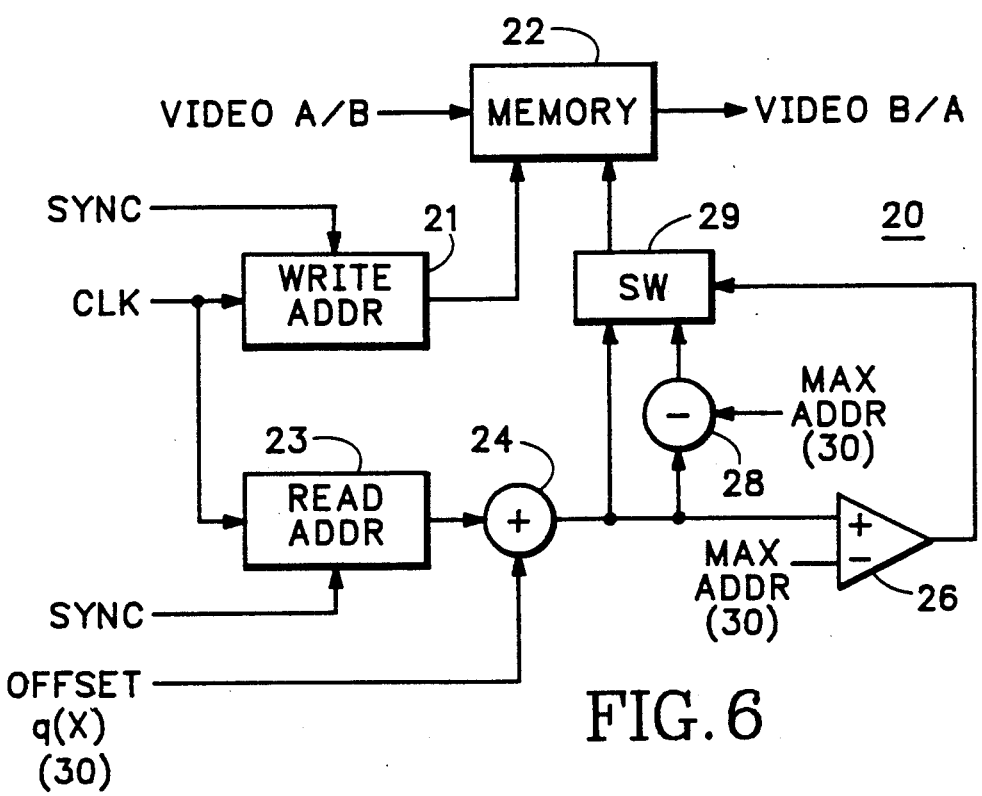
FIG. 6 is a block diagram of a swap video effects module for the apparatus of FIG. 5.

An apparatus for performing the push transition described above is shown in FIGS. 5 and 6. Two video signals, Video A representing the old video and Video B representing the new video, are input to a video combiner 18 under control of a push key signal, K, that is a function of the variable X, a number between zero and one indicating the percentage of the push from totally off screen to totally on screen of the new video, Video B. The combined video Video A/B has Video A as the left X of the screen and Video B as the right (1−X) of the screen. The Video A/B is input to a swap apparatus 20, such as a video effects module, that performs the equivalent of a wraparound translation so that at the output the A and B videos have been swapped to produce the desired push snapshot video, Video B/A. A user inputs to a microprocessor 30 a command indicating the type of push—left to right, right to left, top to bottom, or bottom to top —and the rate of the transition in terms of total time or number of frames. For each frame the microprocessor 30 computes a value for X between zero and one, where zero is the start of the transition and one is the end of the transition. The value of X is input to a key generator 40 to produce the push key as a function of X. For a vertical push X is in terms of a vertical line number and for a horizontal push X is in terms of a horizontal pixel number. The output of the combining circuit 10 is the Video A/B shown as the first part of FIGS. 3A, 3B or 4.

The swap may be performed in many commercially available video effects units, but such units are too general to be discussed in detail here since they are designed to do more than merely swap sections of an image. The following discussion describes generally the elements needed to perform the swap. The Video A/B is written into a memory 22 under control of a write address generator 21. A read address generator 23 outputs a second address signal that is input to an adder 24 and is transformed, by incrementing, either in line number or pixel number, an amount that is a function of X. For example referring to FIG. 3A and 3B assume that each line has 785 pixels and the value of X corresponds to 300 pixels. Then for each output line the increment input to the adder 24 is 485 so that the B portion of the video is read out of the memory 22 before the A portion. The read address from the adder 24 is compared with the maximum number, 785, of addressable pixels either in software in the microprocessor 30, or via a hardware comparator 26 the output of which controls a switch 29. If the address exceeds the maximum number, the maximum number is subtracted from the read address by subtractor 28 and input to the switch 29 together with the absolute address value from the adder 24 so that when the B portion has been read then the A portion is read to produce the swapped video, Video B/A.

The above description applies equally well to vertical swaps, using lines instead of pixels. Also the swap may equally well be made in writing the Video A/B into the memory 22 so that Video B/A is stored.

Thus the present invention provides a single channel video push effect by combining portions of each frame of the Video B input sequence with corresponding complementary portions of each frame of the Video A input sequence and then swapping the combined portions of each frame in the sequence in an effective wraparound translation to produce video output frame sequence push snapshot. A sequence of these push snapshots, in which each succeeding snapshot is formed of a greater proportion of Video B and a lesser proportion of Video A, produces the push effect.

What is claimed is:

1. A method of forming a push snapshot for a video push effect comprising the steps of:
   (a) combining a portion of a first frame of a first video signal with a complementary portion of a first frame of a second video signal; and
   (b) swapping the portion of the first frame of the first video signal with the complementary portion of the 2. A method as recited in claim 1 wherein step (a) comprises:
   (i) generating a key signal that defines a portion of a video frame, and
   (ii) combining that portion of said first frame of the first video signal which is defined by the key signal with that portion of said first frame of the second video signal which is the complement of said portion of the first frame of the first video signal.

3. A method as recited in claim 1 wherein step (a) results in an intermediate video frame and step (b) comprises:
   (i) writing the intermediate video frame into memory under control of a write address signal derived from a sync signal associated with the intermediate video frame,
   (ii) generating a second address signal,
   (iii) transforming the second address signal, and
   reading the intermediate video frame from the memory under control of the transformed second address signal.

4. A method of forming a sequence of push snapshots that represent a video push effect comprising the steps of:
   combining a first portion of a first video source with a complementary portion of a second video source;
   swapping the first portion with the complementary portion to produce a push snapshot; and
   repeating the combining and swapping steps with increased portions of the first video source and decreased portions of the second video source.

5. An apparatus for forming a push snapshot for a video push effect comprising:
   means for combining a portion of a first frame of a first video signal with a complementary portion of a first frame of a second video signal; and
   means for swapping the portion of the first frame of the first video signal with the complementary portion f the first frame of the second video signal to produce the push snapshot.

6. An apparatus for forming a sequence of push snapshots that represent a video push effect comprising:
   means for combining a first portion of a first video source with a complementary portion of a second video source; means for swapping the first portion with the complementary portion to produce a push snapshot; and
   means for repeatedly operating the combining mans and the swapping means with increased portions of the first video source and decreased portions of the second video source.

7. A method of forming a push snapshot video output frame from first and second video input frames, comprising:
   (a) generating an intermediate video frame composed of a portion of the first input frame and a complementary portion of the second input frame, said portion of the first input frame and said complementary portion of the second input frame meeting along a first boundary that extends parallel to first and second opposite edges of the intermediate frame, and
   (b) swapping said portion of the first input frame with said complementary portion of the second input frame to generate the push snapshot output frame in which said portion of the first input frame and said complementary portion of said second input frame meet along a second boundary that extends parallel to said first and second opposite edges of the push snapshot output frame.

8. A method as recited in claim 7 wherein step (a) comprises:
   (i) generating a key signal that defines a portion of a video frame, said portion being limited by said first boundary, and
   (ii) combining that portion of the first input frame which is defined by the key signal with that portion of the second input frame which is the complement of that portion of the first frame which is defined by the key signal.

9. A method for forming a sequence of at least first and second snapshot video output frames from a first sequence of video input frames and a second sequence of video input frames comprising:
   (a) generating a first snapshot video output frame by combining a portion of a first frame of the first sequence and a complementary portion of a first frame of the second sequence and swapping said portion of the first frame of the first sequence with said complementary portion of the first frame of the second sequence; and
   (b) generating a second snapshot video output frame by combining a portion of a second frame of the first sequence and a complementary portion of a second frame of the second sequence, the area of said portion of the second frame of the first sequence being larger than the area of said portion of the first frame of the first sequence, and swapping said portion of the second frame of the first sequence with said complementary portion of the second frame of the second sequence.

10. A method as recited in claim 9 wherein step (a) comprises:
    (i) generating a key signal that defines a portion of a video frame, and
    (ii) combining that portion of the first frame of the first sequence which is defined by the key signal with that portion of the first frame of the second sequence which is the complement of said portion of the first frame of the first sequence.

11. A method as recited in claim 10 wherein step (b) comprises:
    (i) adjusting the key signal so that it defines a portion of the video frame that is larger in area than the portion defined by the key signal in step (a),
    (ii) combining that portion of the second frame of the first sequence which is defined by the adjusted key signal with that portion of the second frame of the second sequence which is the complement of said portion of the second frame of the first sequence.

* * * * *